United States Patent
Tanaka et al.

(10) Patent No.: US 7,333,372 B2
(45) Date of Patent: Feb. 19, 2008

(54) RESET CIRCUIT AND INTEGRATED CIRCUIT DEVICE WITH RESET FUNCTION

(75) Inventors: Hitoshi Tanaka, Kanagawa (JP); Hiroyuki Fukuyama, Yamanashi (JP); Takeru Yonaga, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 360 days.

(21) Appl. No.: 10/958,658

(22) Filed: Oct. 6, 2004

(65) Prior Publication Data

US 2005/0105348 A1 May 19, 2005

(30) Foreign Application Priority Data

Oct. 10, 2003 (JP) ............................. 2003-351925

(51) Int. Cl.
*G11C 7/00* (2006.01)

(52) U.S. Cl. ..................... 365/189.07; 365/189.04; 365/230.01

(58) Field of Classification Search ........... 365/189.07, 365/191, 189.04, 230.01, 94
See application file for complete search history.

(56) References Cited

U.S. PATENT DOCUMENTS

| 6,026,034 A | * | 2/2000 | Suzuki et al. | 365/190 |
| 6,111,805 A | * | 8/2000 | Furutani | 365/226 |
| 6,826,114 B2 | * | 11/2004 | Lee et al. | 365/233 |
| 2004/0090830 A1 | * | 5/2004 | Lee et al. | 365/200 |

FOREIGN PATENT DOCUMENTS

JP 05-299993 11/1993

* cited by examiner

*Primary Examiner*—Thong Q. Le
(74) *Attorney, Agent, or Firm*—Nixon Peabody LLP; Donald R. Studebaker

(57) ABSTRACT

A reset circuit, which generates a reset signal for initializing an internal circuit of an integrated circuit device having an auto-loading function, includes a first register which stores a predetermined expected value data; a second register holding data which was auto-loaded; and a data comparison circuit which performs a comparison between the data held in the second register and the expected value data stored in the first register, and generates the reset signal based on a result of the comparison.

18 Claims, 9 Drawing Sheets

RESET CIRCUIT AND INTEGRATED CIRCUIT DEVICE WITH RESET FUNCTION

BACKGROUND OF THE INVENTION

1. Field of the Invention

The present invention relates to a reset circuit which generates a reset signal for initializing a predetermined circuit in an LSI, and to an integrated circuit device having a reset function.

2. Description of the Related Art

In general, an LSI which does not have an external reset terminal for inputting a reset signal from outside, has a power reset circuit which resets a predetermined circuit in the LSI when the power supply is switched on. For example, Japanese Patent Kokai (Laid-Open) Publication No. 5-299993 discloses an example of a power reset circuit including a resistance, a capacitance and a buffer gate circuit.

In this prior art power-on reset circuit, in order to generate a reset signal having a desired waveform (for example, a desired pulse width), it is necessary to adjust the composition and the size (dimension) of the transistors forming the resistance and capacitance. However, when disigning SOG (Sea of Gates) type ASIC (Application Specific Integrated Circuits), although it is possible to change the gate connection by adjusting a wiring layer, the composition and size (specifically, a gate length and a gate width) of the gate of a transistor cannot be adjusted. Therefore, it is difficult to form a power-on reset circuit having the desired resistance and capacitance in an SOG type ASIC. For this reason, an SOG type ASIC has to be provided with an external reset terminal, and the reset signal generated in the external circuit had to be inputted to the ASIC throught the external reset terminal.

SUMMARY OF THE INVENTION

It is therefore an object of the present invention to provide a reset circuit and an integrated circuit device having a reset function which can provide a power-on reset function to an integrated circuit device without an external reset terminal.

According to one aspect of the present invention, a reset circuit which generates a reset signal for initializing an internal circuit of an integrated circuit device having an auto-loading function, the reset circuit includes a first memory which stores a predetermined expected value data; a second memory holding data which was auto-loaded; and a reset controller which performs a comparison between the data held in the second memory and the expected value data stored in the first memory, and generates the reset signal based on a result of the comparison.

According to another aspect of the present invention, an integrated circuit device having an auto-loading function, includes an internal circuit; and a reset circuit which generated a reset signal for initializing the internal circuit. The reset circuit includes a first memory which stores predetermined expected value data; a second memory which holds auto-loaded data; and a reset controller which performs a comparison between the data held in the second memory and the expected value data stored in the first memory, and generated the reset signal based on a result of the comparison.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
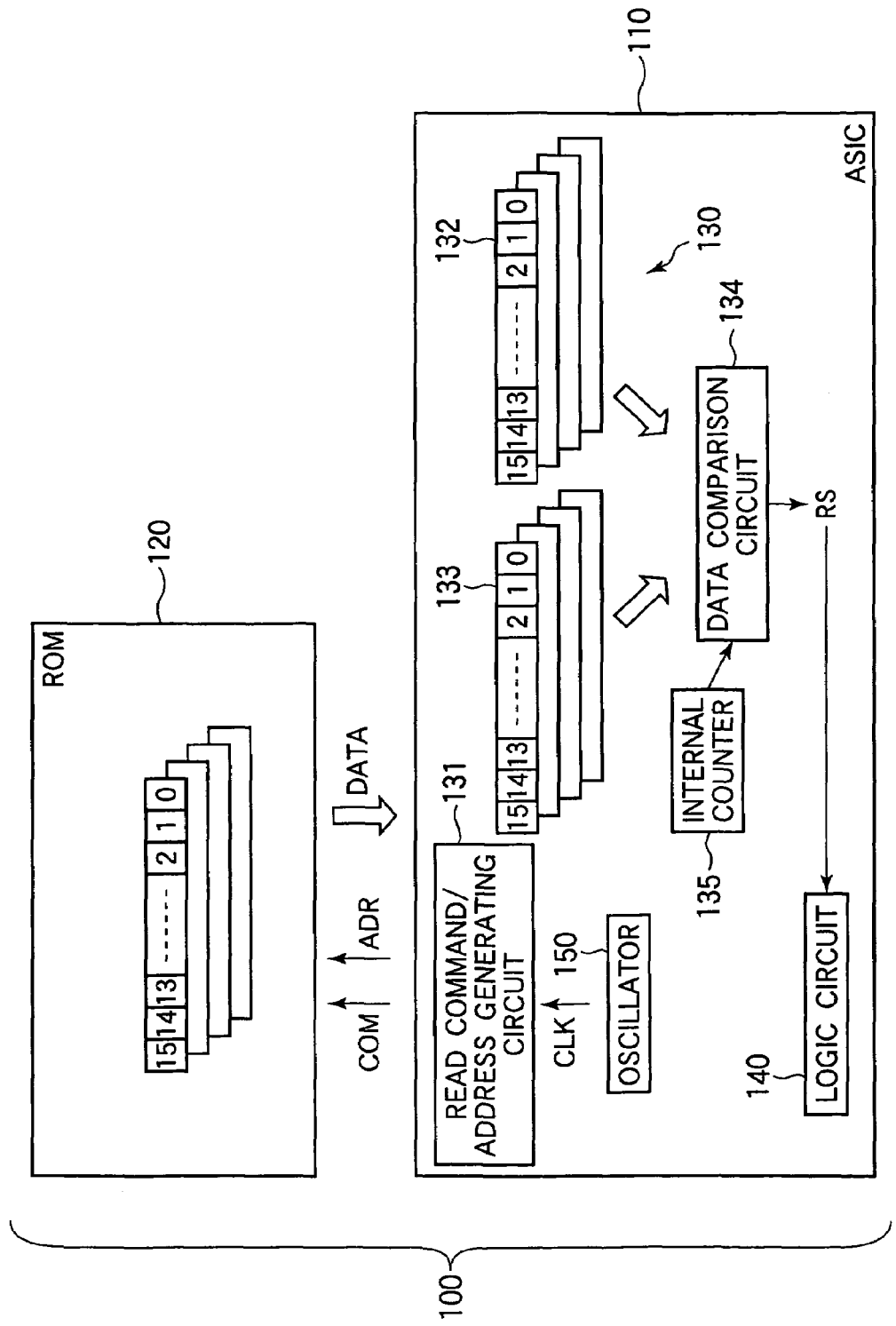
FIG. 1 is a diagram showing the construction and operation of an integrated circuit device according to a first embodiment of the present invention.
Figure 2:
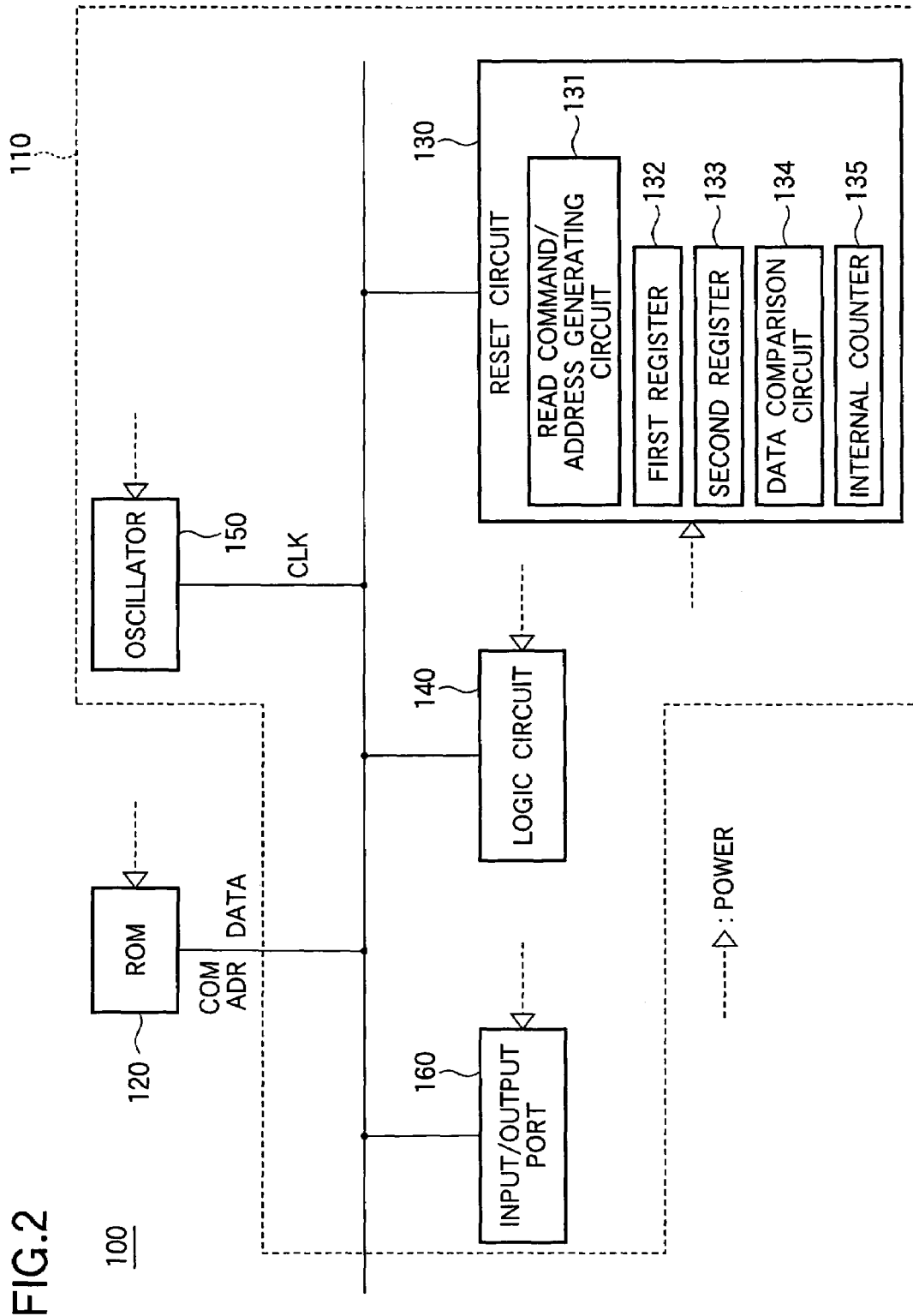
FIG. 2 is a block diagram showing the construction of the integrated circuit device according to the first embodiment.

FIG. 1 is a diagram showing the construction and operation of an integrated circuit device according to a first embodiment of the present invention. FIG. 2 is a block diagram showing the construction of the integrated circuit device according to the first embodiment. As shown in FIGS. 1 and 2, an integrated circuit device 100 includes an SOG type ASIC chip 110 and a ROM chip 120.

As shown in FIG. 2, the ASIC chip 110 has a reset circuit 130 which generates a reset signal RS, a logic circuit (internal circuit) 140, an oscillator 150 which generates an internal clock CLK, and an input/output port 160. The logic circuit 140 is either in a reset state (i.e., an initialized state before starting the normal operation of the logic circuit 130), or a reset release state (i.e., a state after starting the normal operation of the logic circuit 130), according to the reset signal RS generated by the reset circuit 130.

As shown in FIGS. 1 and 2, the reset circuit 130 includes a read command/address generating circuit 131 which generates an address ADR and a read command COM of data which is auto-loaded according to the internal clock CLK, a first register (expected value data storage part) 132 which stores predetermined expected value data, a second register (load data register) 133 holding the data which was auto-loaded, a data comparison circuit (reset controller) 134 which compares the data held in the second register 133 and the expected value data stored in the first register 132, and generates the reset signal RS based on the result of this comparison, and an internal counter 135. The integrated circuit device 100 may be, for example, a semiconductor memory device, but if the integrated circuit device 100 is a semiconductor device having the function of loading data, the present invention can be applied also to a device other than a semiconductor memory device.

Figure 3:
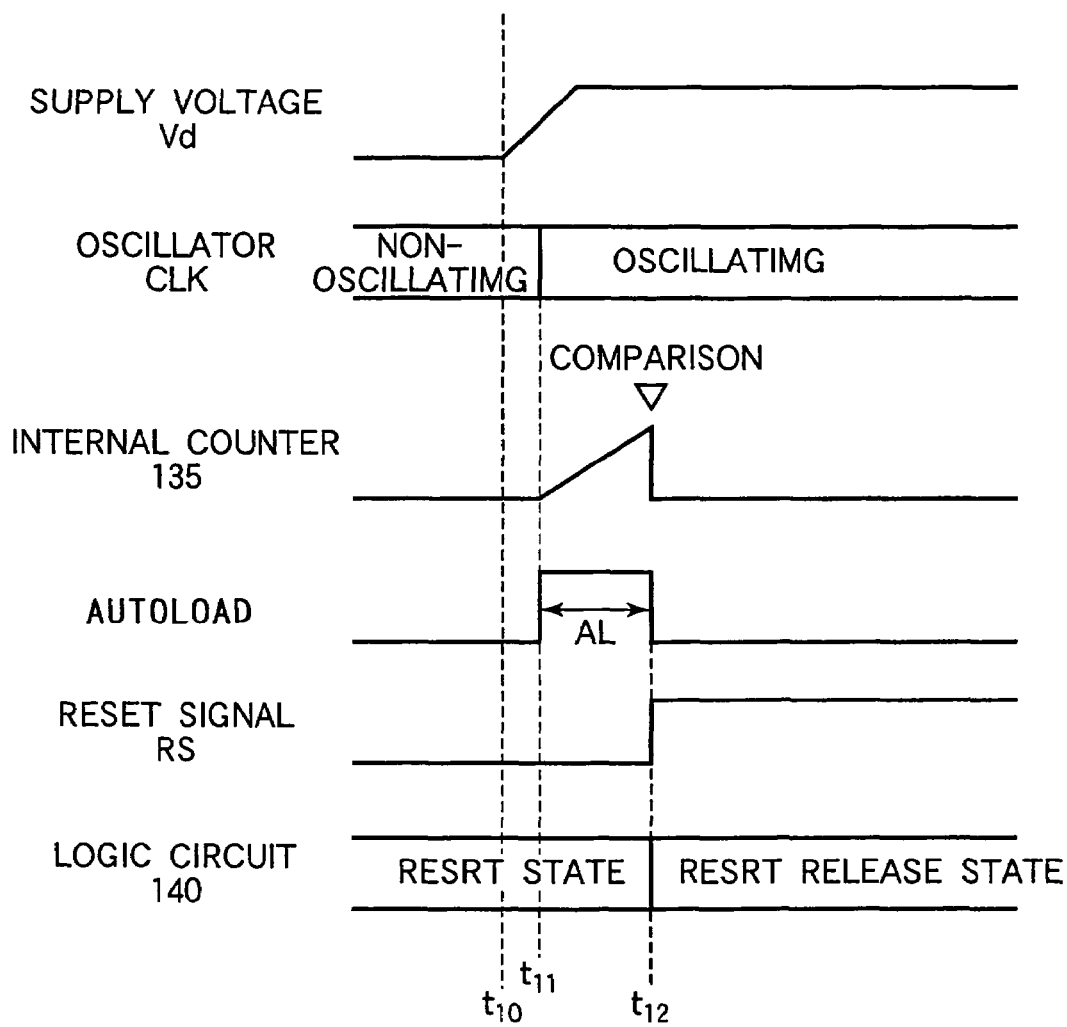
FIG. 3 is a timing chart showing the operation of the integrated circuit device according the the first embodiment.

FIG. 3 is a timing chart showing the operation of the integrated circuit device 100, mainly the operation of the reset circuit 130. As shown in FIG. 3, after power is supplied to the integrated circuit device 100 (after a time $t_{10}$), a supply voltage $V_d$ rises and is stabilized at a predetermined voltage. After power starts to be supplied, when the supply voltage $V_d$ reaches a voltage at which oscillation of the oscillator 150 is possible (a time $t_{11}$), an oscillator 11 oscillates and the internal clock CLK is outputted. A read command/address generating circuit 12 performs a cyclic count of the internal clock CLK by an internal counter 135 to a steady value (for example, in the case of a twenty-bit configuration, 'FFFFF' (hexadecimal notation)), and sends the address ADR and read command COM to the ROM chip 120 according to this count. Due to this, preprogrammed data (16 bits×4 words) stored in a domain specified in the address ADR of the ROM chip 120 is read out. The data read by this auto-loading operation (from the time $t_{11}$ to the time $t_{12}$, i.e., the period AL in FIG. 3) is held in the load data register 133 (16 bits×4 words) of the ASIC chip 110.

Identical data to the data stored in the predetermined domain of the ROM chip 120 is hard set (0/1 fixation) beforehand in the expected value data storage part 132. When the internal counter 135 counts a steady value (for example, 'FFFFF' (hexadecimal notation (a time $t_{12}$)), the data comparison circuit 134 compares the data held in the load data register 133 with the expected value data which is hard set in the expected value data storage part 132. When, as a result of this comparison, the data held in the load data register 133 and the expected value data set in the expected value data storage part 132 do not coincide, it is determined that the ASIC chip 110 is in a transient state and that it has not yet reached a stable state which performs normal operation. On the other hand, when the data held in the load data register 133 and the expected value data set in the expected value data storage part 132 coincide, it is determined that the ASIC chip 110 has reached the stable state.

Therefore, the data comparison circuit 134 generates the reset signal RS which, when the data held in the load data register 133 and the expected value data set in the expected value data storage part 132 do not coincide, changes over the logic circuit 140 in the ASIC chip 110 to the reset state, and when the data held in the load data register 133 and the expected value data set in changes over the logic circuit 140 in the ASIC chip 110 to the reset release state. At the time $t_{12}$, went the data held in the load data register 133 and the expected value data set in the expected value data storage part 132 coincide, the expected value data storage part 132 coincide, the reset signal RS is low level before the time $t_{12}$, and high-level after the time $t_{12}$, for example as shown in FIG. 3. Also at the time $t_{12}$, when the data held in the load data register 133 and the expected value data set in the expected value data storage part 132 do not coincide, the reset signal RS continues to be maintained at a low level, and the logic circuit 140 maintains the reset state.

As described above, according to the first embodiment, before verifying that the supply voltage has reached the state where the internal circuit can be stably operated, the internal circuit of the internal circuit is in a reset state using the load data register 133, the expected value data storage part 132 and the data comparison circuit 134, and after making the aforesaid verification, the reset state of the internal circuit is in a reset release state. Hence, if the integrated circuit device 100 or reset circuit 130 according to the first embodiment is used, after the supply voltage reaches the state where operational stability of the internal circuit can be achieved, the internal circuit can be changed over to the normal operation state (i.e., reset release state) in the same way as an integrated circuit device which has an external reset terminal.

Figure 4:
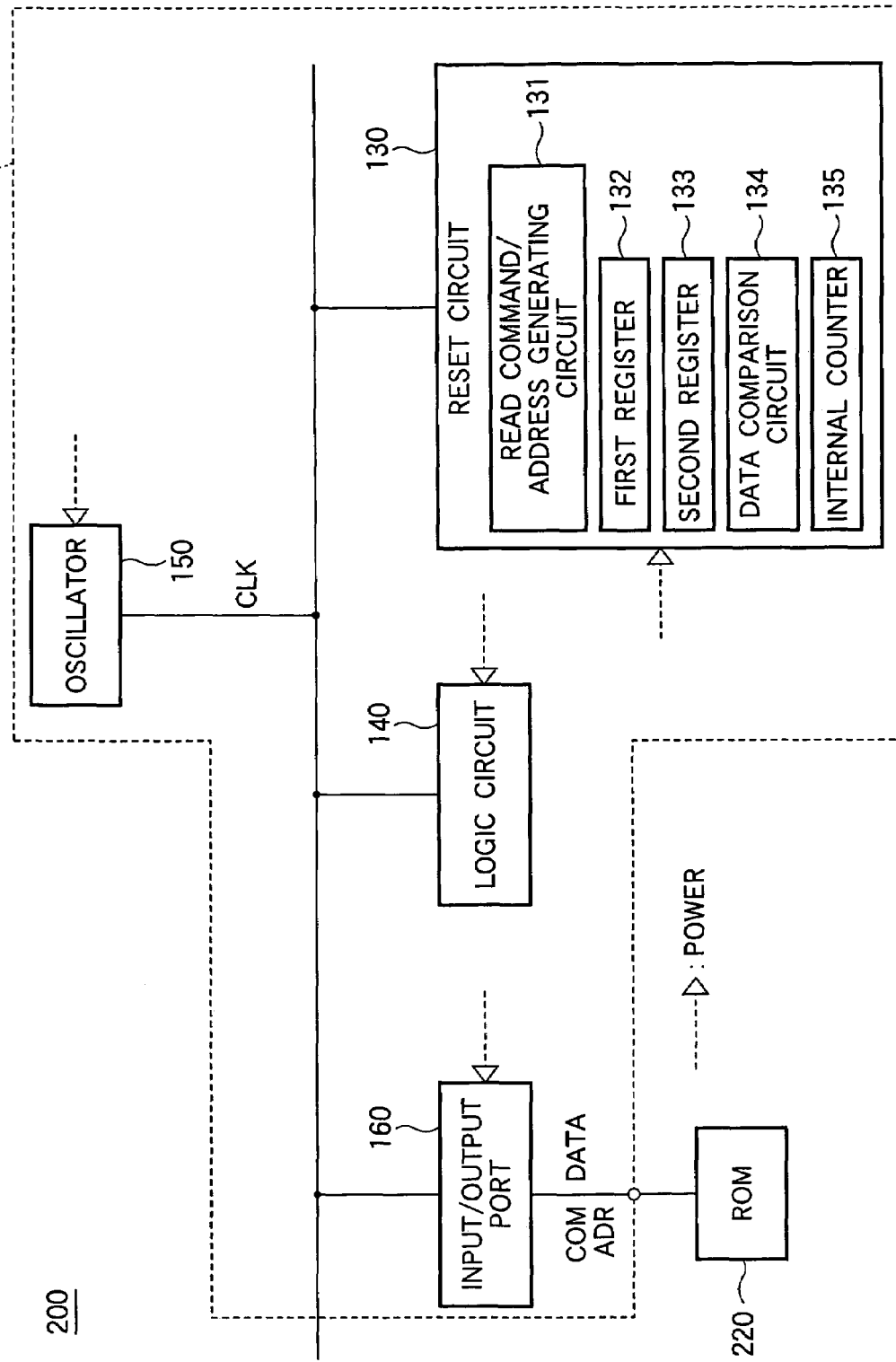
FIG. 4 is a block diagram showing a modification of the integrated circuit device according the the first embodiment.

FIG. 4 is a block diagram showing the construction of a modification of the integrated circuit device according to the first embodiment. In FIG. 4, parts which are identical or corresponding to those shown in FIG. 2 are given identical symbols. In the integrated circuit device 100 shown in FIG. 2, the ROM chip 120 is a part of the integrated circuit device 100, but in an integrated circuit device 200 shown in FIG. 4, a ROM device 220 is not a part of the integrated circuit device 200, and is connected to the integrated circuit device 200 by an input/output port 160. The integrated circuit device 200 shown in FIG. 4 is identical to the integrated circuit device 100 shown in FIG. 2 except that the ROM device 220 is external.

Figure 5:
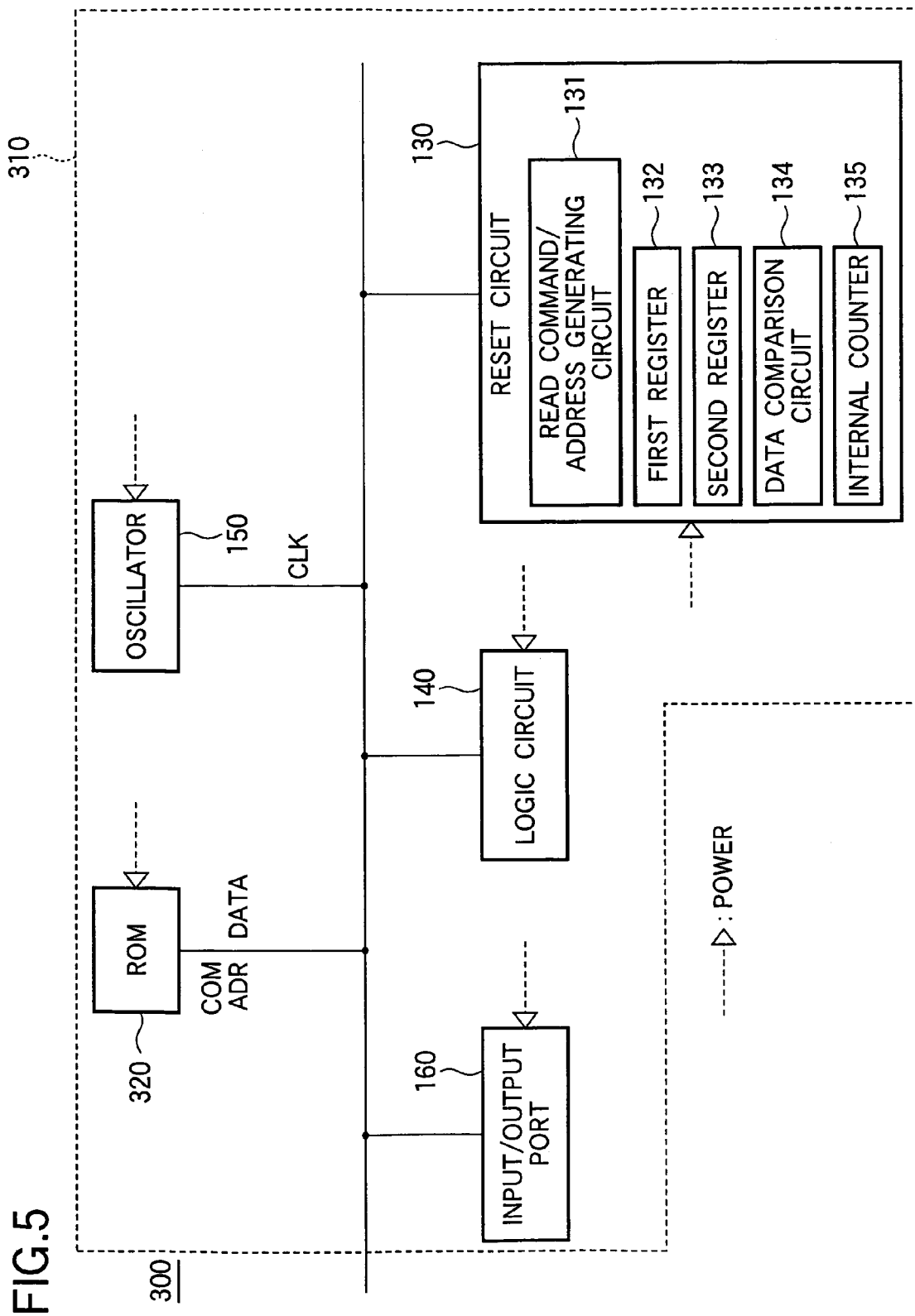
FIG. 5 is a block diagram showing another modification of the integrated circuit device according to the first embodiment.

FIG. 5 is a block diagram showing the construction of another modification of the integrated circuit device according to the first embodiment. In FIG. 5, parts which are identical or corresponding to those shown in FIG. 2 are given identical symbols. In the integrated circuit device 100 shown in FIG. 2, the ROM chip 120 is a separate chip from the ASIC chip 110 of the integrated circuit device 100, but in the integrated circuit device 300 shown in FIG. 5, a ROM 320 is formed as a part of the ASIC chip 310 of the integrated circuit device 300. The integrated circuit device 300 shown in FIG. 5 is identical to the integrated circuit device 100 shown in the aforesaid FIG. 2 except that the ROM 320 is formed as part of the ASIC chip 310.

Second Embodiment

Figure 6:
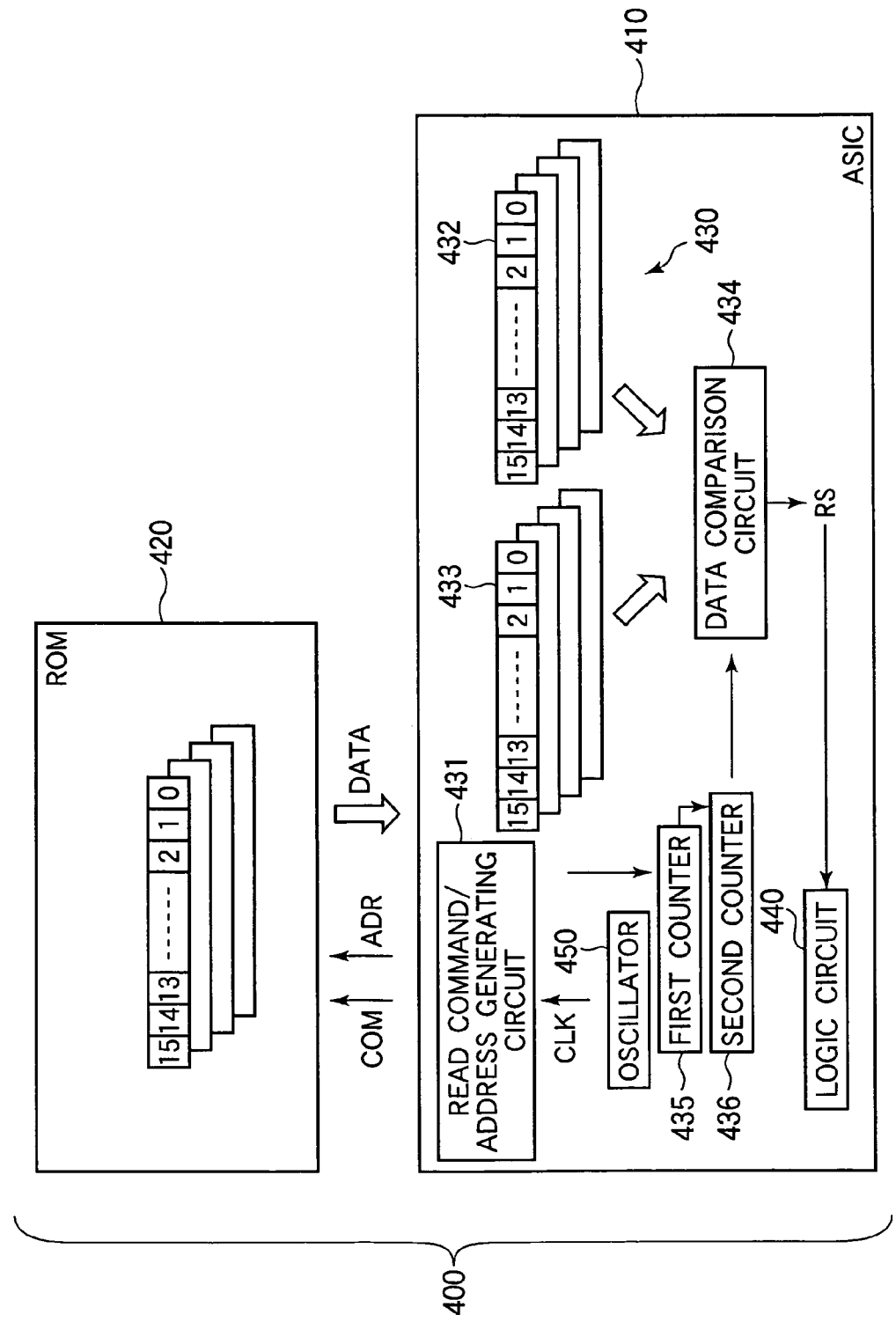
FIG. 6 is a diagram showing the construction and operation of an integrated circuit device according to a second embodiment of the present invention.
Figure 7:
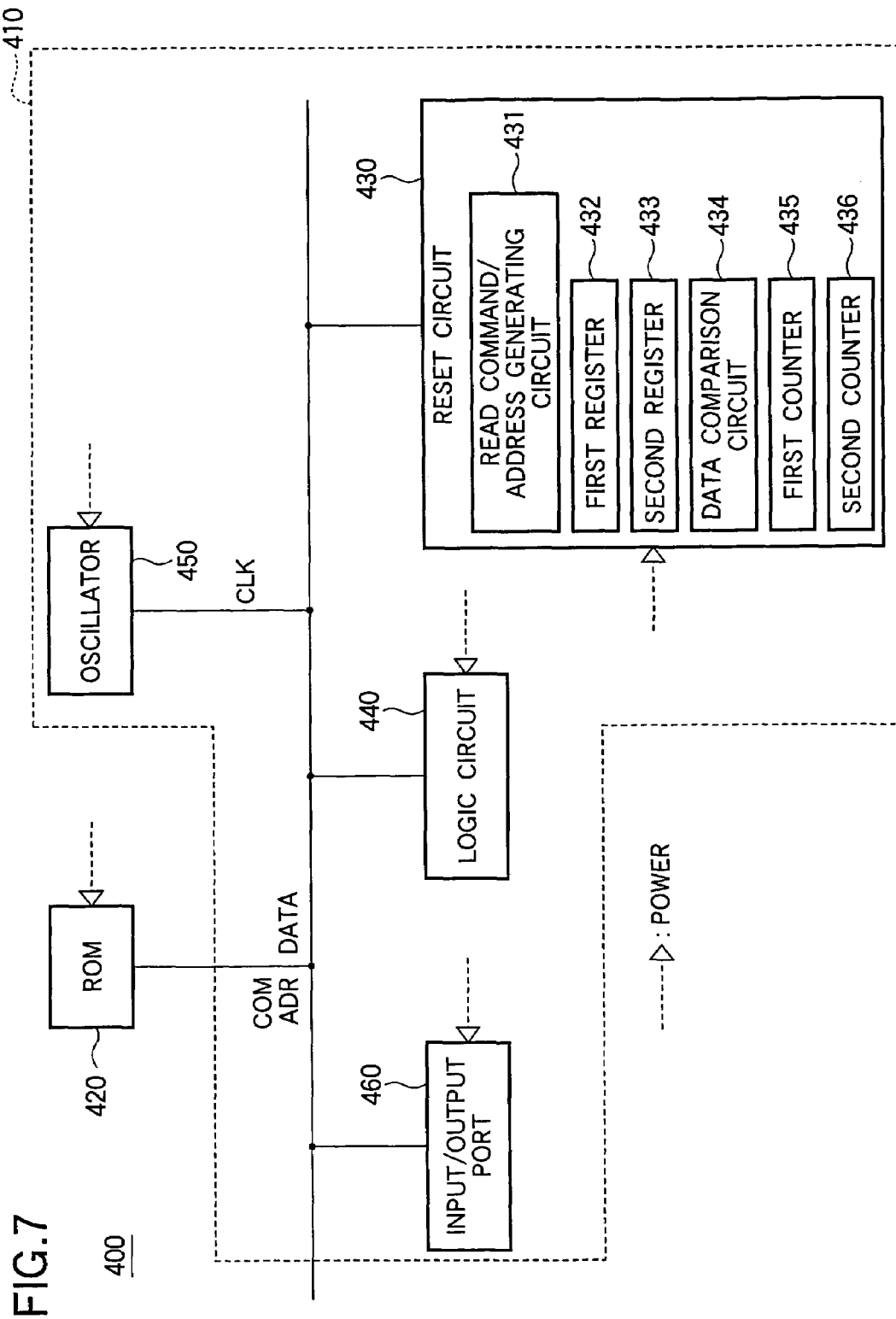
FIG. 7 is a block diagram showing the construction of the integrated circuit device according to the second embodiment.

FIG. 6 is a diagram showing the construction and operation of an integrated circuit device according to a second embodiment of the present invention. FIG. 7 is a block diagram showing the construction of the integrated circuit device according to the second embodiment. As shown in FIGS. 6 and 7, and integrated circuit device 400 includes an SOG type ASIC chip 410 and a ROM chip 420.

As shown in FIG. 6, the ASIC chip 410 has a reset circuit 430 which generates a reset signal RS, a logic circuit (internal circuit) 440, an oscillator 450 which generates an internal clock CLK, and an input/output port 460. The logic circuit 440 is either in a reset state (i.e., an initialized state before starting normal operation of the logic circuit 430), or a reset release state (i.e., a state after starting normal operation of the logic circuit 430) according to the reset signal RS generated by the reset circuit 430.

As shown in FIGS. 6 and 7, the reset circuit 430 includes a read command/address generating circuit 431 which generates an address ADR and a read command COM for data which is auto-loaded according to the internal clock CLK, a first register (expected value data storage part) 432 which stores predetermined expected value data, a second register (load data register) 433 holding data which was auto-loaded, a data comparison circuit (reset controller) 434 which compares the data held in the second register 433 and the expected value data stored in the first register 432, and generates a reset signal RS based on a result of this comparison, a first counter 135, and a second counter 136.

The first counter 435 performs a cyclic count of the internal clock CLK to a fixed value (for example, in the case of a twenty-bit configuration, 'FFFFF' (hexadecimal notation)), and the second counter 436 measures the number of times the first counter 435 performed the cyclic count. In the second embodiment, at a time (i.e., time $t_{22}$) when the second counter 436 has measured a predetermined number of times, a comparison between the data held in the second register 433 and the expected value data stored by the first register 432 is performed, and the reset signal RS is generated based on a result of this single comparison. In the aforesaid first embodiment, when the data held in the load data register 133 and the expected value data which is hard set in the expected value data storage part 132 coincide, the data comparison circuit 134 unconditionally performs reset release, but in the second embodiment, before the second counter 436 reaches the predetermined value (e.g., all bits are '1', i.e., the count value is '63'), reset release is not performed.

Although the integrated circuit device 400 may, for example, be a semiconductor memory device, if the present invention is a semiconductor device other than a semiconductor memory device having a function to load data, it can also be applied also to a device other than a semiconductor memory device.

Figure 8:
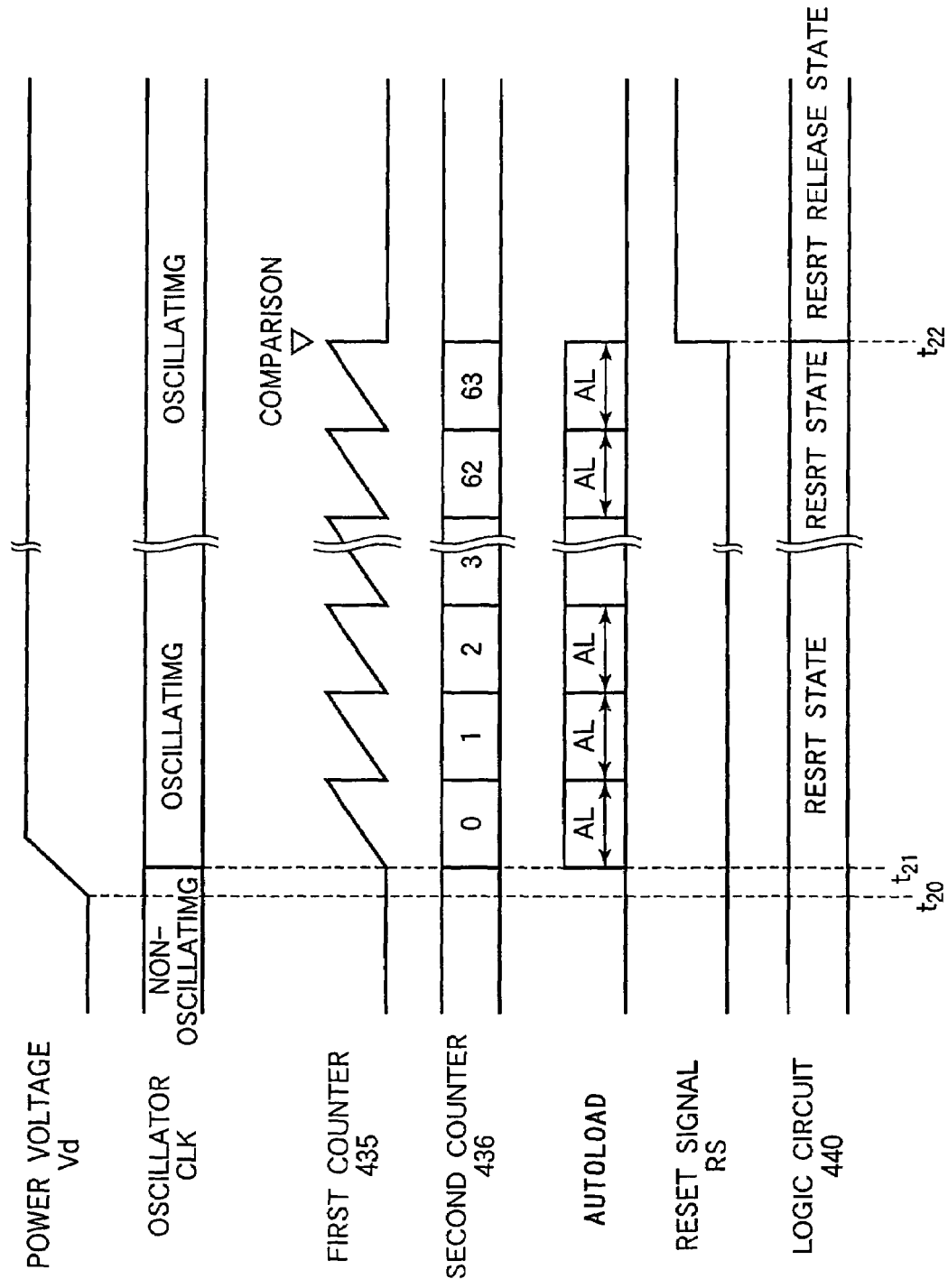
FIG. 8 is a timing chart showing the operation of the integrated circuit device according the the second embodiment.

FIG. 8 is a timing chart showing the operation of the integrated circuit device 400 and the operation of the reset circuit 430. As shown in FIG. 8, after power is supplied to the integrated circuit device 400 (after a time $t_{20}$), the supply voltage $V_d$ rises and is stabilized at a predetermined voltage. After power starts to be supplied, when the supply voltage $V_d$ reaches the voltage at which oscillation of the oscillator 150 is possible (time $t_{21}$), the oscillator 450 oscillates and the internal clock CLK is outputted. The read command/address generating circuit 431 performs a cyclic count of this internal clock CLK up to a steady value (for example, in the case of a twenty-bit configuration, 'FFFFF' (hexadecimal notation)) with the first counter 435, and sends the address ADR and a read command COM to the ROM chip 420 according to this count. In this way, read-out of the preprogrammed data (16 bits×4 words) stored in the domain specified in the address ADR of the ROM chip 420 is performed. The data read by this auto-loading operation (period AL) is held in the load data register 433 (16 bits×4 words) of the ASIC chip 410. In the second embodiment, as shown in FIG. 8, the auto-load AL is repeated plural times (in FIG. 8, sixty four times), and at the time $t_{22}$, the data held in the lead data register 433 and the expected value data which is hard set in the expected value data storage part 432 are compared.

When the data held in the load data register 433 and the expected value data set in the expected value data storage part 432 do not coincide, it is determined that the ASIC chip 410 is in a transient state and the stable state in which normal operation is performed has not been reached. On the other hand, when the data held in the load data register 133 and the expected value data set in the expected value data storage part 432 coincide, it is determined that the ASIC chip 410 has reached the stable state.

Therefore, the data comparison circuit 434 generates the reset signal RS which, when the data held in the load data register 433 and the expected value data set in the expected value data storage part 432 do not coincide, changes over the logic circuit 140 in the ASIC chip 410 to the reset state, and when the data held in the load data register 433 and the expected value data set in the expected value data storage part 432 coincide, changes over the logic circuit 440 in the ASIC chip 110 to the reset release state. At the time $t_{22}$, when the data held in the load data register 433 and the expected value data set in the expected value data storage part 432 coincide, the reset signal RS is low-level before the time $t_{22}$, and high-level after the time $t_{22}$, for example as shown in FIG. 8. Also at the time $t_{22}$, when the data held in the load data register 433 and the expected value data set in the expected value data storage part 432 do not coincide, the reset signal RS continues to be maintained at a low level, and the logic circuit 440 maintains the reset state.

As described above, according to the second embodiment, before verifying that the supply voltage has reached the state where the internal circuit can be stably operated, using the load data register 433, the expected value data storage part 432 and the data comparison circuit 434, the internal circuit is in a reset state, and after the aforesaid verification, the reset state of the internal circuit is released. Hence, if the integrated circuit device 400 or reset circuit 430 according to the first embodiment is used, after the supply voltage reaches the state where operational stability of the internal circuit can be achieved, the internal circuit can be changed over to the normal operation state (reset release state) in the same way as an integrated circuit device which has an external reset terminal.

Figure 9:
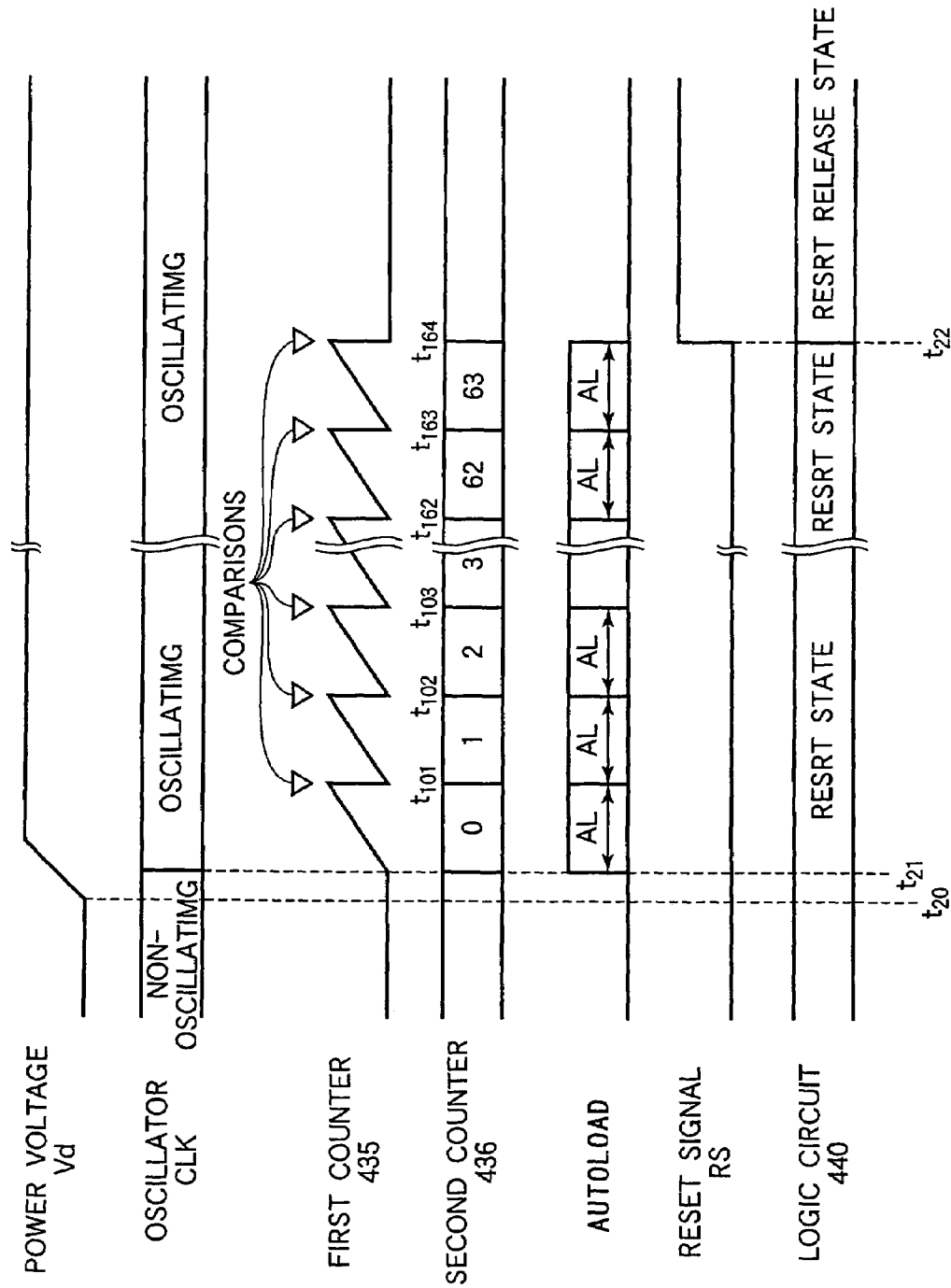
FIG. 9 is a timing chart showing the operation of modification of the integrated circuit device according to the second embodiment.

FIG. 9 is a timing chart showing the operation of a modification of the integrated circuit device according to the second embodiment. A difference from the operation shown in FIG. 8 is that a comparison between the data stored in the second register 433 and the expected value data stored in the first register 432 is performed each time the internal clock CLK is counted up to a fixed value (for example, in the case of a twenty-bit configuration, 'FFFFF'(hexadecimal notation) (times $t_{101}, \ldots, t_{164}$) and the reset signal RS is generated based on these plural comparison results. In the example shown in FIG. 9, the reset signal is generated such that, if the data held in the load register 433 and the expected value data set in the expected value data storage part 432 do not coincide for at least one of the times $t_{101}, \ldots, t_{164}$, the logic circuit 440 in the ASIC chip 410 is changed over to the reset state, and when the data held in the load data register 433 and the expected value data set in the expected value data storage part 432 coincide at all the times $t_{101}, \ldots, t_{164}$, the logic circuit 440 in the ASIC chip 410 is changed over to the reset release state.

In the operation of FIG. 9, in addition to the effect of the operation of FIG. 8, incorrect reset release due to a ROM read-out fault when power starts to be supplied, and incorrect reset release due to accidental coincidence between the initial value of the load data register 433 and the expected value data, can be prevented.

In the first and second embodiments described above, an auto-loading operation was performed when power was switched on by the oscillators 150, 450, and the load command/address generating circuits 131, 431, but the invention is not limited to this construction, and can be applied to any construction where data stored in a ROM is read when power is switched on.

Moreover, in the first and second embodiments, although the data read by auto-load, the load data registers 133,433 and the expected value data storage parts 132, 432 were considered to have a bit width of 16 bits×4 words, and a six-bit construction where the counters 135, 435, 436 can count from '0' to '63' was assumed, the invention is not limited to this construction and may be any construction depending on the magnitude of noise or the usage situation of the ASIC.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A reset circuit which generates a reset signal for initializing an internal circuit of an integrated circuit device having an auto-loading function, said reset circuit comprising:
a first memory which stores a predetermined expected value data;
a second memory holding data which was auto-loaded; and
a reset controller which performs a comparison between said data held in said second memory and said expected value data stored in said first memory, and generates said reset signal based on a result of said comparison, wherein said auto-loaded data is data auto-loaded from a ROM.

2. The reset circuit according to claim 1, wherein said reset controller includes a measurement part which measures time;
and
when said measurement part has measured a predetermined time after power supply to said integrated circuit device is switched on, said reset controller performs said comparison between said data held in said second memory and said expected value data stored in said first memory, and generates said reset signal as a result of said comparison when said reset controller determines that said data held in said second memory coincides with said expected value data stored in said first memory.

3. The reset circuit according to claim 2, wherein said measurement part includes a counter which measures an internal clock of said integrated circuit device.

4. The reset circuit according to claim 1, wherein
said reset controller includes a first measurement part which repeatedly measures a predetermined time, and a second measurement part which measures number of times said first measurement part has measured said predetermined time; and
when said second measurement part has measured said predetermined number of times, said reset controller performs said comparison between said data held in said second memory and said expected value data stored in said first memory, and generates said reset signal as a result of said comparison when said data held in said second memory coincides with said expected value data stored in said first memory.

5. The reset circuit according to claim 4, wherein
said first measurement part includes a first counter which cyclically counts an internal clock of said integrated circuit device up to a fixed value; and
said second measurement part includes a second counter which measures number of times said first counter has cyclically counted up to said fixed value.

6. The reset circuit according to claim 1, wherein
said reset controller includes a first measurement part which repeatedly measures a predetermined time, and a second measurement part which measures the number of times said first measurement part has measured said predetermined time; and
said reset controller performs said comparison between said data held in said second memory and said expected value data stored in said first memory each time said measurement part measures said predetermined time until said second memory has measured a predetermined number of times, and generates said reset signal based on a result of said plural comparisons.

7. The reset circuit according to claim 6, wherein:
said first measurement part includes a first counter which cyclically counts an internal clock of said integrated circuit device up to a fixed value; and
said second measurement part includes a second counter which measures number of times said first counter has cyclically counted up to said fixed value.

8. The reset circuit according to claim 1, wherein said reset circuit is formed from an ASIC chip.

9. An integrated circuit device having an auto-loading function, comprising:
an internal circuit; and
a reset circuit which generates a reset signal for initializing said internal circuit;
wherein said reset circuit includes:
a first memory which stores predetermined expected value data;
a second memory which holds auto-loaded data; and
a reset controller which performs a comparison between said data held in said second memory and said expected value data stored in said first memory, and generates said reset signal based on a result of said comparison;
the integrated circuit device further comprising a ROM which holds said auto-loaded data, wherein the auto-loading by said reset circuit is an auto-loading from said ROM.

10. The integrated circuit device according to claim 9, wherein said reset circuit is connected to a ROM, and the auto-loading by said reset circuit is an auto-loading from said ROM.

11. The integrated circuit device according to claim 9, further comprising:
an oscillator which generates an internal clock; and
a read command/address generating circuit which generates an address and a read command for data auto-loaded according to said internal clock.

12. The integrated circuit device according to claim 9, wherein
said reset controller includes a measurement part which measures time; and
when said measurement part has measured a predetermined time after power supply to said integrated circuit device is switched on, said reset controller performs said comparison between said data held in said second memory and said expected value data stored in said first memory, and generates said reset signal as a result of said comparison when said reset controller determines that said data held in said second memory coincides with said expected value data stored in said first memory.

13. The integrated circuit device according to claim 12, wherein said measurement part includes a counter which measures an internal clock of said integrated circuit device.

14. The integrated circuit device according to claim 9, wherein
said reset controller includes a first measurement part which repeatedly measures a predetermined time, and a second measurement part which measures number of times said first measurement part has measured said predetermined time; and when said second measurement part has measured said predetermined number of times, said reset controller performs said comparison between said data held in said second memory and said expected value data stored in said first memory, and generates said reset signal as a result of said comparison when said data held in said second memory coincides with said expected value data stored in said first memory.

15. The integrated circuit device according to claim 14, wherein said first measurement part includes a first counter which cyclically counts an internal clock of said integrated circuit device up to a fixed value; and said second measurement part includes a second counter which measures number of times said first counter has cyclically counted up to said fixed value.

16. The integrated circuit device according to claim 9, wherein said reset controller includes a first measurement part which repeatedly measures a predetermined time, and a second measurement part which measures the number of times said first measurement part has measured said predetermined time; and said reset controller performs said comparison between said data held in said second memory and said expected value data stored in said first memory each time said measurement part measures said predetermined time until said second memory has measured a predetermined number of times, and generates said reset signal based on a result of said plural comparisons.

17. The integrated circuit device according to claim 9, wherein:

said first measurement part includes a first counter which cyclically counts an internal clock of said integrated circuit device up to a fixed value; and said second measurement part includes a second counter which measures number of times said first counter has cyclically counted up to said fixed value.

18. The integrated circuit device according to claim 9, wherein said reset circuit is formed from an ASIC chip.

* * * * *